Nov. 14, 1972 P. DUNGAN 3,702,789
PROCESS FOR ELIMINATING FLASHING FROM MOLDED
THERMOPLASTIC ARTICLES
Filed Nov. 25, 1970 2 Sheets-Sheet 1

INVENTOR:
PAUL DUNGAN
BY: *Edward J Hanson Jr.*
ATTORNEY

Nov. 14, 1972   P. DUNGAN   3,702,789
PROCESS FOR ELIMINATING FLASHING FROM MOLDED
THERMOPLASTIC ARTICLES
Filed Nov. 25, 1970   2 Sheets-Sheet 2

United States Patent Office 3,702,789
Patented Nov. 14, 1972

3,702,789
PROCESS FOR ELIMINATING FLASHING FROM MOLDED THERMOPLASTIC ARTICLES
Paul Dungan, Cedar Rapids, Iowa, assignor to W. R. Grace & Co., Duncan, S.C.
Filed Nov. 25, 1970, Ser. No. 92,810
Int. Cl. B08b 7/00
U.S. Cl. 134—5
3 Claims

ABSTRACT OF THE DISCLOSURE

Flashing left on an article after molding is eliminated by raising the temperature of the flashing until it no longer exists. Thermoplastic flashing is heated until it melts and merges with the general surface of the article. Preferably a ribbon heater is positioned closely adjacent to the flashing and heated for a time sufficient to melt the flashing, which is generally paper thin, without damaging the adjacent surfaces of the article.

This invention relates to a method of and an apparatus for removing flashing from articles.

In the past it has been the general practice to remove the flashing by pinching the flashing while it is hot and then tearing it off. This removes the primary flashing beyond the pinched region but leaves a secondary rudimentary flashing that has in the past generally been trimmed off by cutting with a sharp instrument such as a knife. Knife trimming of the flashing was frequently either incomplete or damaged the carrying case. Because knife trimming is a hard operation, its results are generally not consistent or uniform. In special circumstances and under special conditions other means have been employed to remove flash, an example of this is shown in U.S. Pat. 2,967,326.

SUMMARY OF THE INVENTION

By this invention a method is provided for eliminating flashing and the like from plastic articles by raising the temperature of the flashing until the flashing is caused to substantially cease to exist as a visible flashing on the article. This is preferably done by exposing the flashing to heat and melting the flashing while leaving the adjacent parts of the article relatively unaffected. This is done without shielding the adjacent relatively unaffected surfaces of the article. The heat is most preferably supplied by closely juxtapositioning electric ribbon heaters directly adjacent to the flashing and holding them in a manner that will maintain their positions substantially constant.

By another aspect of my invention, apparatus is provided for expeditiously removing flashing from an article. The apparatus includes means for generating heat in the flashing at a level that will substantially eliminate obvious visual residue of the flashing. The heat generating means is preferably a heater and means are provided for juxtapositioning the heater adjacent to the flashing for a time sufficient to melt the flashing without damaging the adjacent surfaces of the article even if the surfaces are not shielded. The heater is most preferably an electric ribbon heater resistor element that expands when heated and the means juxtapositioning the heater adjacent to the flashing include special means for maintaining the heater element in relatively constant position adjacent to the flashing by compensating for the heating elements expansion.

It is an object of this invention to provide an improved means for eliminating flashing on articles and particularly thermoplastic articles.

It is yet another object of this invention to provide such a means that is substantially simple and foolproof in operation having expeditious means for providing adjustments to maintain the device in superior operating conditions.

The subject matter which I regard as my invention is particularly pointed out and distinctly claimed in the concluding portion of this specification. My invention, however, both as to organization and method of operation, together with further objects and advantages thereof, may be best understood by references to the following description taken in conjunction with the accompanying drawings in which:

Figure 4A:
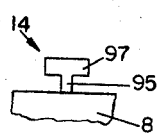
FIG. 4A is the movable latch portion 14 of the carrying case of FIG. 4.
Figure 4:
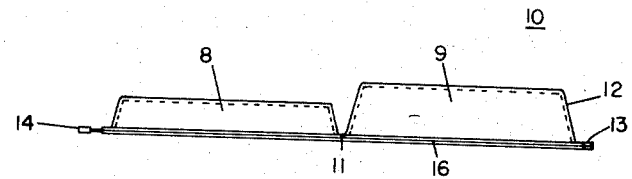
FIG. 4 is a side elevational view of a carrying case of the type treated on the apparatus of this invention to remove the visible flashing showing the inside wall configuration in phantom lines.

Looking first at FIG. 4 the carrying case 10 will be seen therein. The carrying case 10 has two mating parts that close together, a top 8 and a bottom 9, joined by a hinge 11. Both parts of the carrying case 10 have relativelffiy upright side walls 12 with a movable latch member 14 projecting from one part or side thereof and a latch receiving member or catch 13 on the other part or side thereof. Flashing 16 has been left by the molding operation.

Generally the invention of this application is directed to removing thermoplastic type flashing that is thin, usually substantially paper thin in thickness. By paper thin it is meant that the flashing at its widest point is little thicker than ordinary stationery paper and in its major regions is often as thin as onion skin type stationery. This is generally a secondary flashing, by which it is meant that, for example, a pinch member in the mold pinched the flashing adjacent to the walls of the carrying case and the flashing beyond this pinch area was torn off by the operator leaving a small rudimentary flashing, the secondary flashing. From this it will be understood that the flashing does not project very far beyond the main body of the carrying case. While this invention may be used to eliminate the visible flashing from other types of articles it is particularly applicable to plastic articles and particularly those formed of thermoplastics such as polyethylene and polypropylene. These two thermoplastic materials are mentioned by way of example only, because they are two of the primary materials presently used in forming such thermoplastic articles. The terms are not intended to in any way exclude other materials that would melt or be substantially visually eliminated by the application of my invention.

Now, as may be seen the secondary flashing 16 on the carrying case 10 extends substantially continuously as a paper thin featheredge at the outer lower periphery of the relatively upright side walls 12 and contiguous to the movable latch portion 14.

Figure 3:
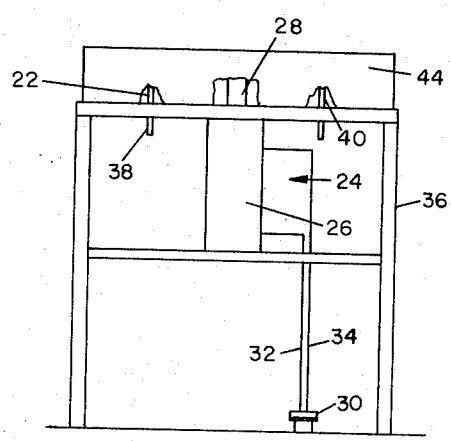
FIG. 3 is a simplified side elevational view of the device of FIG. 1.

Looking now at FIGS. 1 and 3 the apparatus or device 20 of the invention of this application will be described in detail. A reciprocal platform, plat means 22 with its appendages provides the form for positioning the carrying case in open and flattened out position, the position depicted in FIG. 4. The reciprocal platform 22 reciprocates between a first position or level for loading to a second or lower position or level which is the flashing removal level for deflashing. The platform 22 is mounted on a reciprocating mounting means 24 which includes an air cylinder 26 which has a piston rod 28 connected to the platform 22. The air cylinder is a double action or two way positive air drive cylinder connected to a controlling foot pedal 30 by two air lines 32 and 34. Thus an operator may reciprocate the platform 22 by operation of the foot pedal. The foot pedal controls a valve connected to an air source (not shown). It may be seen that the air cylinder and the reciprocating platform are mounted on a frame 36. Guide rods 38 and 40 are journaled in the mounting support plate means 42 to assure the even reciprocal movement of the platform 22. A housing 44 is connected to the frame 36 to protect operating personnel from contact with the functional and hot parts of the apparatus 20.

Figure 1:
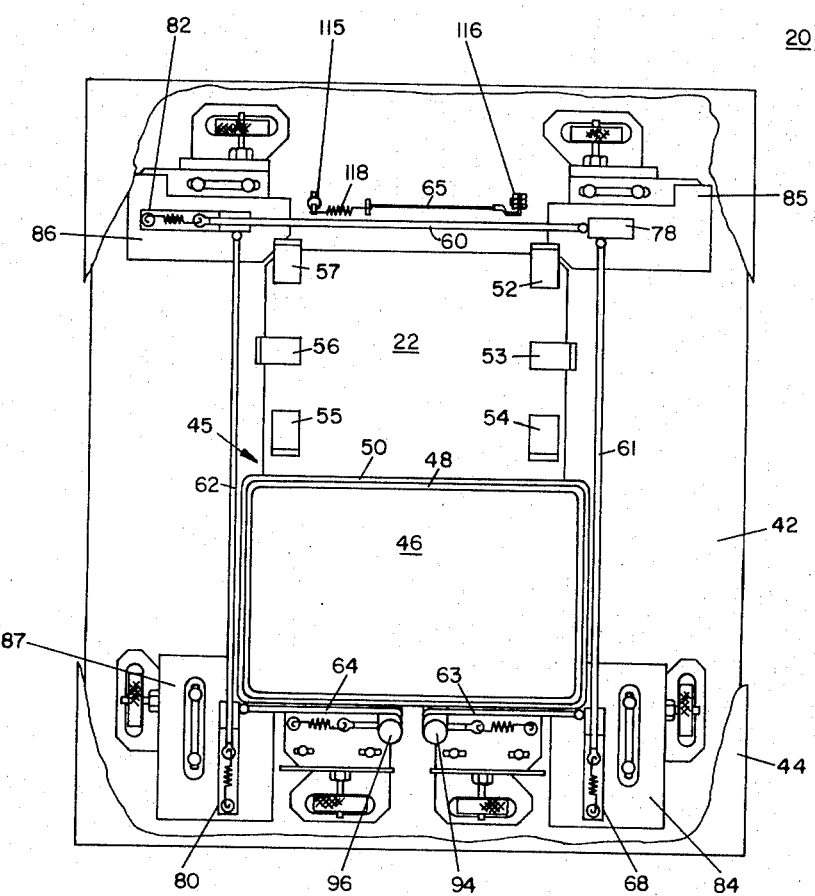
FIG. 1 is a schematic top plan view of the apparatus of my invention with the housing cover broken away.

Looking next at FIG. 1 it may be seen that the platform 22 and its appendages make a form or horizontal holding carriage 45 which contains mounting means for assuring the proper alignment of the carrying case that is to be deflashed. Positive positioning shield means 46 is secured to one end of the platform 22. The shield means include an inwardly projecting portion having a slightly sloping side wall 48 and a ledge 50. This shield member is dimensioned to be closely received in mating engagement within the open area of the top 8 of the carrying case 10. The shield was found desirable because in this particular application there was a tendency for heat to cause a slight warpage and misalignment of the smaller top portion 8. The misalignment lessened the effectiveness of the deflashing operation. It was found that the shield 46 prevented this small warpage. Actually the significantly effective heat shielding portion of the shield is probably only its outer ledge 50 because the heaters do not radiate a very substantial amount of heat very far beyond this.

The other half of the platform 22 has a plurality of upstanding L members 52, 53, 54, 55, 56 and 57 which engage in the deeper portion 9 of the carrying case 10 to insure its positioning and complete the form 45. This larger portion 9 of the carrying case was found to have more mass and to be less subject to warpage. The L members are preferably mounted with limited horizontal loose motion so that they are somewhat self aligning in the deeper portion 9 of the carrying case. In other words the shield member 46 is the positive positioning means and the L member has slight horizontal movement as may be required to conform to the carrying case position required by the shield member 46. The L members are the positive positioners of the elevational or vertical position of the deeper portion 9.

A plurality of radiant ribbon heater elements 60, 61, 62, 63, 64 and 65 are closely juxtapositioned to the position at which the flashing will be disposed when the form 45 is in its lowered position. Thus the flashing is in deflashing relationship to the ribbon heaters when the platform 22 is in its lowered position. It is generally desirable to place transite board (not shown) under the ribbon heaters on the plate means 42 which is normally metal to prevent the ribbon heaters from electrically engaging the plate means should they break.

Ribbon heaters 60, 61 and 62 are mounted in substantially the same manner and the mounting or juxtapositioning means include constant positioning means for maintaining the heater elements in a relatively constant position adjacent to the flashing by compensating for the ribbon heater's expansion. It has been found that the ribbon heater should not vary from a position within from $1/64$ to $10/64$ inch of the flashing more preferably within from $3/64$ to $9/64$ inch of the flashing or $6/64$ inch plus or minus a tolerance of $3/64$ inch I have found the best means for providing this desired end is to suspend each ribbon heater by mounting one end in stationary position and tensioning the other end at its mounting by a spring means.

Figure 2:
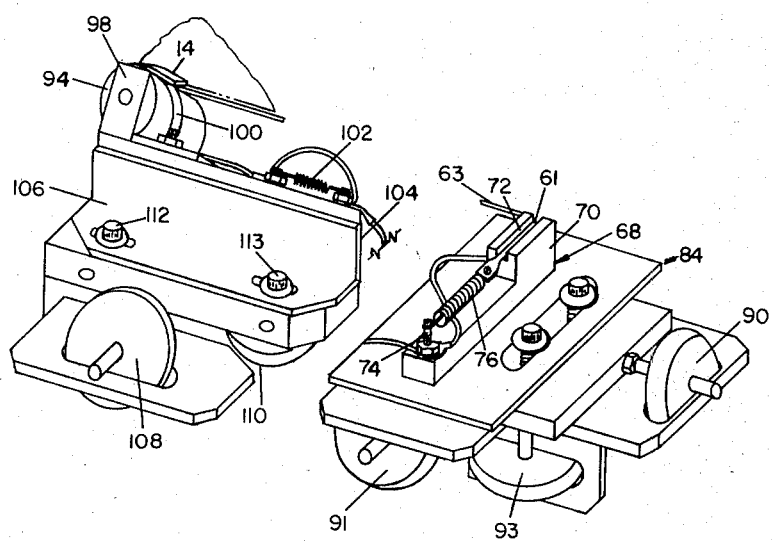
FIG. 2 is an isometric view of the adjusting parts shown in the lower right hand corner of FIG. 1, showing more detail.

Looking at FIGS. 1 and 2 and taking ribbon heater 61 by way of example, I have found this most expeditiously and preferably accomplished by preparing an elongated brass block 68 with an upstanding portion 70 at one end thereof. A guide and positioning slot 72 is formed in the top of the upstanding portion 70 and set at an angle of 45° so as to maintain the ribbon heater at a 45° angle to the flashing which is close to a 45° angle to both the upstanding side walls of the box particularly in the flashing area, and to the horizontal or top surface of mounting plate 42. An upstanding member 74 is provided at the other end of the brass block from the upstanding portion 70 and spaced therefrom. The brass block 68 is positioned on the mounting plate 42 with its elongated dimension aligned with the ribbon heater with the upstanding portion extending toward the stationarily mounted end of the ribbon heater. A helical spring 76 is attached at one of its ends to the tensioned end of the ribbon heater 61 and by its other end to the upstanding member 74 thereby mounting the tensioned end of the ribbon heater in a manner assuring that the heater will remain in position even during its expansion and contraction. The stationarily mounted end of the ribbon heater 61 is secured to a brass block mounting means 78.

Ribbon heater 62 is mounted at a 45° angle in the same general manner as ribbon heater 61. Ribbon heater 60 is mounted in the same general manner but is disposed flat under the edge of the carrying case in generally the same plane as the flashing and close to a 90° angle to the upstand side walls of the box, particularly in the flashing area, and in a horizontal plane parallel to the top surface of the mounting plate 42.

Brass block 82 is similar to brass block 68 except the guide and positioning slot is flat rather than set on an angle. Brass block 80 is substantially identical to brass block 68 except it is opposite hand. The stationary mounting brass block 78 is different and mounts the stationarily mounted ends of both resistor 60 and resistor 61. Resistor 62 has its stationarily mounted end secured to the brass block 82. Thus the brass block 82 serves both as a tensioning mounting means and a stationary mounting means.

The brass blocks 68, 78, 80 and 82 are mounted on equivalent adjusting means 84, 85, 86 and 87 and electrically insulated therefrom. By way of example only adjusting means 84 will be described in detail. As may be seen in FIGS. 1 and 2 adjusting means 84 consists of a number of plates bolted together in such a manner that they may slide relative to one another. At least one adjusting drive nob 90 moves the adjustable brass block 68 in a first horizontal direction. It will be understood that only portions of the adjusting means move horizontally to move the brass block 68. Another adjusting drive nob 91 moves the brass block 68 horizontally at a 90° angle to the first direction of movement. Adjusting drive nob 93 moves the brass block 68 vertically. It will be understood that other adjusting means having equivalent directional adjustment functionality could be provided in certain instances. One example of such other means shall be discussed subsequently with respect to adjusting another part.

Looking at FIGS. 1 and 2 another type of juxtapositioning means may be seen to be provided for maintaining the ribbon in constant position closely adjacent the flashing. This means includes a pair of roller members 94 and 96. The roller members are set at substantially a 45° angle to the flashing which is close to a 45° angle to both the upstanding side walls of the box, particularly in the flashing area, and to the horizontal or top surface of the mounting plate 42. The rollers slant up from under the edge of the wall of the carrying case and rise substantially above the lower edge of the walls and are spaced apart and adjacent to one another. Each of the roller members and their means for mounting the ribbon heater are the same except that the ribbon heaters extend away from the rollers in opposite directions. Therefore the detailed mounting of the ribbon heater on or around a roller will be given with respect only to ribbon heater 63 which is mounted on roller 94 and shown in enlarged view in FIG. 2. The roller is journaled in journaling means including bracket 98. A slot 100 is formed in the outer surface of the roller for retaining the ribbon heater in position. The ribbon heater 63 is engaged in the slot and extends over and under roller 94. A portion of the ribbon heater 63 passing under the roller 94 is engaged or attached to a helical spring 102. This is the tensioned end of the ribbon heater 63. The helical spring 102 is attached to a mounting means 104 and thereby mounts the ribbon heater. The stationarily or positively mounted end of the ribbon heater 63 is secured to the brass block 68. The ribbon heater 64 is secured to brass block 80 at its stationarily mounted end.

Instead of guide slot 100 the rollers may have smooth surfaces and guides may be provided for maintaining the ribbon heaters in relative position on the roller. The rollers should generally be of insulating material and a ceramic material is preferred.

The mounting means 104 is attached to an adjustable means 106 and electrically insulated therefrom. This adjustment means has only two adjusting drive nob means, means 108 for one direction horizontal adjustment and means 110 for vertical adjustment. The general manner of operation respecting these two adjustments is the same as that previously described respecting the adjusting means 84. For horizontal adjustment in the other direction screws 112 and 113 are loosened and the adjustable means 106 is slipped under the screws which are engaged in slots as shown in FIG. 2. After the desired adjustment is made these screws are retightened. This is an example of another adjusting means as previously mentioned in this application. The roller 96 is similarly mounted for adjustment.

The two rollers are spaced apart as has been mentioned already and this provides an interruption in the surrounding of the carrying case by the ribbon heaters in the area of the latch 14 (FIGS. 4 and 4A). The latch on the carrying case is in the form of a "T" with the portion extending from the side walls of the carrying case outwardly being the strap or stalk 95 with an outer end projecting from each side thereof and being the cross member 97 on the T. The cross member 97 bridges the space between the two rollers 94 and 96. The rollers cam the latch upwardly out of the way of the ribbon heater where they engage the cross member 97 as illustrated in FIG. 2. The strap 95 is no wider than the space between the separation of the two rollers and thus it is not damaged by heat. Thus the ribbon heater is interrupted in the area of the latch but not sufficiently to entirely miss the cross member 97 of the latch. It may be seen therefore that the rollers are positioned to engage a movable portion of the carrying case, latch 14, so as to cam this portion upwardly and entirely out of the way so that it misses the ribbon heater portions engaged in the roller slots. The ribbon heater at this point is thus, in effect, discontinuous so as to miss the latch and prevent its damage.

Another ribbon heater 65 is provided beyond the ribbon heater 60 to deflash the catch 13 which projects or extends beyond the main wall area of the carrying case. The ribbon heater 60 underlies the catch 13 and generally supplies substantial heat to the catch area and the flashing on the catch. However it is ribbon heater 65 which supplies the primary heat to remove the flashing from the catch area. Because of the mass of the catch area and the positioning of the heaters the heat is not such as to damage the catch 13.

The ribbon heater 65 is positioned at a 90° angle to the flash or perpendicularly to the flash and raised slightly above the ribbon heater 60. The ribbon heater 65 extends between two upstanding posts 115 and 116. The ribbon heater 65 is attached to post 116 at its stationarily mounted end and to the other post at its tensioned end by helical spring 118, with one end of the helical spring attached to the tensioned end of the ribbon heater 65 and the other end of the helical spring attached to the post 115. Posts 115 and 116 may be mounted on asbestos board.

The ribbon heaters 61, 62, 63 and 64 are all turned at an angle and disposed at approximately 45° to the plane of the flashing and the carrying case side walls and slanted up under the edge of the flashing and side walls and rise up to the flashing and preferably a little above the flashing. These ribbon heaters together with ribbon heater 60 extend substantially continuously around the carrying case. If the corners of the boxes are rounded which is the case in the box shown, as may be observed from the shield 46, the resistor at the very tip of the curved edge may be a little more than the desired distance away from the corner. However, this has not been found to present much of a problem although at the very edge the flashing may not be totally eliminated beyond the visibility point. Usually only such a small part of the flashing will remain that it is not considered a consequential problem.

An excellent ribbon heater has been found to be 5/16 inch wide by .010 inch thick with .296 ohm per foot resistance consisting of 70% nickel and 30% chrome. The heater element produces a red glow during operation and has a temperature of approximately 2,000° F. in the element when operated at 75 volts and 40 amps for a 3 to 4 second period. If heater 61 is 21 5/8 inches long it will expand about 5/16 inch during heating. Those skilled in the art can easily supply the connecting operable wiring. I used a variable transformer and provided automatic energizing of the heating elements by means of a micro switch initiated by the lowering of the reciprocal platform 22 and a electric timer and a relay for energizing and de-energizing the heating elements. The ribbon heaters are heated for a period of time preferably of from 2 to 6 seconds and more preferably from 2 to 5 seconds. Usually 3 to 4 seconds are sufficient. The resistors or ribbon heaters are preferably heated from 1,500 to 2,500° F.

Turning now to the operation of the device 20 of my invention, first any large outer flashing is removed from the carrying case 10 leaving only the small mass relatively thin secondary flashing. Then the carrying case is placed upside down on a horizontal holding carriage 45. The carriage 45 is then lowered into the unit's housing 44 by operation of pedal 30. This locates the flashing area that is to be deflashed in proper position in close proximity to the ribbon heaters to enable the removal or reduction of the apparent visible flashing. To assure positive positioning of the carrying case around its entire periphery it is the general practice to have the operator place his hands on the outside of the box and press downwardly at this time. As the carriage lowers into position it triggers a micro switch setting off a timed activation of the ribbon heaters for the periods previously described. When the heaters cut off at the end of the timed period the operator can observe this because of the reduction in light coming from the housing. The operator then removes his foot from the foot pedal 30 causing the carriage 22 to be returned to its starting position. The now deflashed carrying case is removed from the carriage and the apparatus is ready for a repeating of the operation. In the particularly preferred embodiment shown this entire operation takes about 5 to 6 seconds.

While I have described my apparatus employing ribbon heaters it is obvious that other heater means could be employed. For example bars having enclosed gas burners that heat the bars, which bars radiate the heat to the flashing could also be used.

While in accordance with the patent statutes, I have described what at present is considered to be the preferred embodiment of my invention, it will be obvious to those skilled in the art that numerous changes and modifications may be made therein without departing from the invention and it is therefore aimed in the appended claims to cover all such equivalent variations as fall within the true spirit and scope of the invention.

I claim:
1. A method of eliminating flashing and the like from molded thermoplastic articles comprising
   (a) suspending an electrically heated ribbon heater immediately adjacent the portions of the periphery of said article having flashing,
   (b) heating the ribbon heater to a temperature sufficient to melt the flashing without affecting the remaining portions of the article, and
   (c) maintaining the position of said heater during step (b) so that the heater remains within the range of 1/64 to 10/64 of an inch from said flashing.

2. The method of claim 1 wherein said article has side walls having flashing thereon and said ribbon heater is positioned at an angle of about 45° to the plane of said side walls and rising up to the flashing.

3. The method of claim 1 wherein said ribbon heater is positioned in close conformity to substantially the entire periphery of said article so that all flashing is removed at one time.

References Cited
UNITED STATES PATENTS

| | | | |
|---|---|---|---|
| 2,526,624 | 10/1950 | Adams | 134—17 UX |
| 2,692,328 | 10/1954 | Jaye | 219—221 UX |
| 3,160,687 | 12/1964 | Andrews | 264—80 X |
| 3,475,229 | 10/1969 | Geen et al. | 134—19 X |
| 3,578,734 | 5/1971 | Woodward et al. | 264—80 |

BARRY S. RICHMAN, Examiner

U.S. Cl. X.R.

134—19; 264—80